United States Patent
Kurzanski et al.

(10) Patent No.: US 9,143,475 B2
(45) Date of Patent: Sep. 22, 2015

(54) UNIFIED MESSAGING PROXY, A SYSTEM AND A METHOD THEREOF

(71) Applicant: Synchronoss Technologies, Inc., Bridgewater, NJ (US)

(72) Inventors: Jérémi Kurzanski, Marseilles (FR); François Colon, Marseilles (FR)

(73) Assignee: Synchronoss Technologies, Inc., Bridgewater, NJ (US)

(*) Notice: Subject to any disclaimer, the term of this patent is extended or adjusted under 35 U.S.C. 154(b) by 56 days.

(21) Appl. No.: 13/753,394

(22) Filed: Jan. 29, 2013

(65) Prior Publication Data
US 2014/0214974 A1    Jul. 31, 2014

(51) Int. Cl.
*H04L 12/58* (2006.01)
*H04L 29/08* (2006.01)
*G06Q 10/10* (2012.01)

(52) U.S. Cl.
CPC ............... *H04L 51/16* (2013.01); *G06Q 10/10* (2013.01); *G06Q 10/107* (2013.01); *H04L 67/2823* (2013.01)

(58) Field of Classification Search
CPC ....... H04L 12/581; H04L 51/04; H04L 65/60; H04L 51/32; H04L 67/26
USPC .......................................... 709/202, 204, 206
See application file for complete search history.

(56) References Cited

U.S. PATENT DOCUMENTS

| | | | |
|---|---|---|---|
| 6,654,787 B1 | 11/2003 | Aronson et al. | |
| 7,466,810 B1 | 12/2008 | Quon et al. | |
| 8,706,841 B2 * | 4/2014 | Gordon et al. | 709/218 |
| 2007/0124390 A1 | 5/2007 | Sivakumar et al. | |
| 2008/0313297 A1 * | 12/2008 | Heron et al. | 709/207 |
| 2009/0125595 A1 | 5/2009 | Maes | |
| 2010/0159961 A1 | 6/2010 | Bowman et al. | |
| 2012/0087319 A1 * | 4/2012 | Raleigh et al. | 370/329 |
| 2012/0143974 A1 * | 6/2012 | Zhang et al. | 709/206 |
| 2012/0278418 A1 * | 11/2012 | Heron et al. | 709/206 |
| 2013/0110978 A1 * | 5/2013 | Gordon et al. | 709/218 |
| 2013/0212191 A1 * | 8/2013 | Suraj et al. | 709/206 |
| 2014/0075464 A1 * | 3/2014 | McCrea | 725/14 |

FOREIGN PATENT DOCUMENTS

WO    2007031963 A2    3/2007

* cited by examiner

*Primary Examiner* — Liangchea Wang
(74) *Attorney, Agent, or Firm* — Haverstock & Owens LLP

(57) ABSTRACT

Embodiments of the present invention are directed to a unified messaging proxy and a method thereof. The unified messaging proxy advantageously enables a user to be communicatively coupled with the same account on a messaging platform using multiple end user devices at the same time, allowing the user to read messages on a first end user device and send messages from a second end user device. The unified messaging proxy manages the multiple end user devices and intercepts all messages to and from the multiple end user devices and the messaging platform. From its perspective, the messaging platform only sees a single client messaging application.

22 Claims, 5 Drawing Sheets

UNIFIED MESSAGING PROXY, A SYSTEM AND A METHOD THEREOF

FIELD OF THE INVENTION

The present invention relates to a unified messaging proxy, a system and a method thereof.

BACKGROUND OF THE INVENTION

Some prior art instant messaging solutions are not designed for multiple devices usage. These prior art instant messaging solutions were designed decades ago with no mobility in mind. As such, by design, a session cannot be connected to more than one device, preventing a user from reading messages on both of his PC and mobile device at the same time. For example, if the user begins messaging using the PC, messages associated with the open session will be received on the PC. However, if the user continues messaging using the mobile device, messages thereafter will be received on the mobile device rather than on the PC since the connection between with the messaging service and the PC will become disconnected. The messaging service typically only allows connection from the last connected device, thereby disconnecting the connection from the previously connected device.

End user devices are getting cheaper, smarter and ubiquitous, and owning multiple end user device is becoming prevalent. It is not uncommon to use one end user device to access everything. It is also not uncommon to use multiple end user devices to access one thing, including a messaging service. Thus, there is a need for a unified messaging proxy, a system and a method thereof.

SUMMARY OF THE INVENTION

Embodiments of the present invention are directed to a unified messaging proxy and a method thereof. The unified messaging proxy advantageously enables a user to be communicatively coupled with the same account on a messaging platform using multiple end user devices at the same time, allowing the user to read messages on a first end user device and send messages from a second end user device. The unified messaging proxy manages the multiple end user devices and intercepts all messages to and from the multiple end user devices and the messaging platform. From its perspective, the messaging platform only sees a single client messaging application.

In one aspect, a non-transitory computer-readable medium is provided. The non-transitory computer-readable medium stores instructions that, when executed by a computing device, cause the computing device to perform a method.

The method includes maintaining a device list of at least one end user device. In some embodiments, maintaining a device list includes detecting all end user devices associated with a common network by adding a new end user device to the device list upon the new end user device associating with the common network and by removing an existing end user device from the device list upon that end user device disassociating with the common network.

The method also includes maintaining a service list of at least one service hosted by a messaging platform. In some embodiments, maintaining a service list includes detecting all services access from any device in the device list by adding a new service to the service list upon access to the new service by any device in the device list and by removing an existing service from the service list upon one of detecting that a messaging application on each devices from the device list is no longer active and detecting that the device list no longer includes any devices.

The method also includes interfacing between the messaging platform and the at least one end user device, storing a message thread for a session associated with an account on the messaging platform, and pushing to any of the at least one end user device that do not have the entire message thread any missing messages. In some embodiments, pushing to any of the at least one end user device includes detecting a new end device and sending the new end device the entire message thread.

In some embodiments, the method also includes intercepting a message from a first end user device, and forwarding the message to other end user devices and to the messaging platform.

In some embodiments, the method also includes intercepting a message from the messaging platform, and forwarding the message to each of the at least one end user device.

In some embodiments, the method also includes maintaining a user list of at least one user who uses any device in the device list.

In another aspect, a system is provided. The system includes a session associated with an account on a messaging platform, a plurality of end user devices associated with a network and configured to access the session, and a unified messaging proxy communicatively coupled between the plurality of end user device and the messaging platform. The network is a local network, such as a home network or an office network. In some embodiments, an operator is a local network, and the unified messaging proxy is used for an operator infrastructure.

In some embodiment, each end user device is a smart device. The plurality of end user devices include a first end user device configured to open the session.

The unified messaging proxy is configured to manage the plurality of end user devices such that to the messaging platform, only one client messaging application is associated with the session. In some embodiments, the unified messaging proxy resides in an ADSL provider infrastructure.

In some embodiments, the unified message proxy is configured to interface with a plurality of messaging platforms.

In some embodiments, the unified messaging proxy configured to manage the session, detect a second end user device that has associated with the network, and synching messages from the session on the second end user device.

In some embodiments, the unified messaging proxy is configured to receive a message from one of the plurality of end user devices, and push the message to others of the plurality of user devices and to the messaging platform.

In some embodiments, the unified messaging proxy is configured to receive a message from the messaging platform and push the message to the plurality of end user devices.

In some embodiments, the system allows a user is able to read messages on the first end user device and send messages from the second end user device.

BRIEF DESCRIPTION OF THE DRAWINGS

Reference will now be made in detail to implementations of the present invention as illustrated in the accompanying drawings. The same reference indicators will be used throughout the drawings and the following detailed description to refer to the same or like parts.

DETAILED DESCRIPTION OF THE INVENTION

In the following description, numerous details are set forth for purposes of explanation. However, one of ordinary skill in the art will realize that the invention can be practiced without the use of these specific details. Thus, the present invention is not intended to be limited to the embodiments shown but is to be accorded the widest scope consistent with the principles and features described herein.

Figure 1:
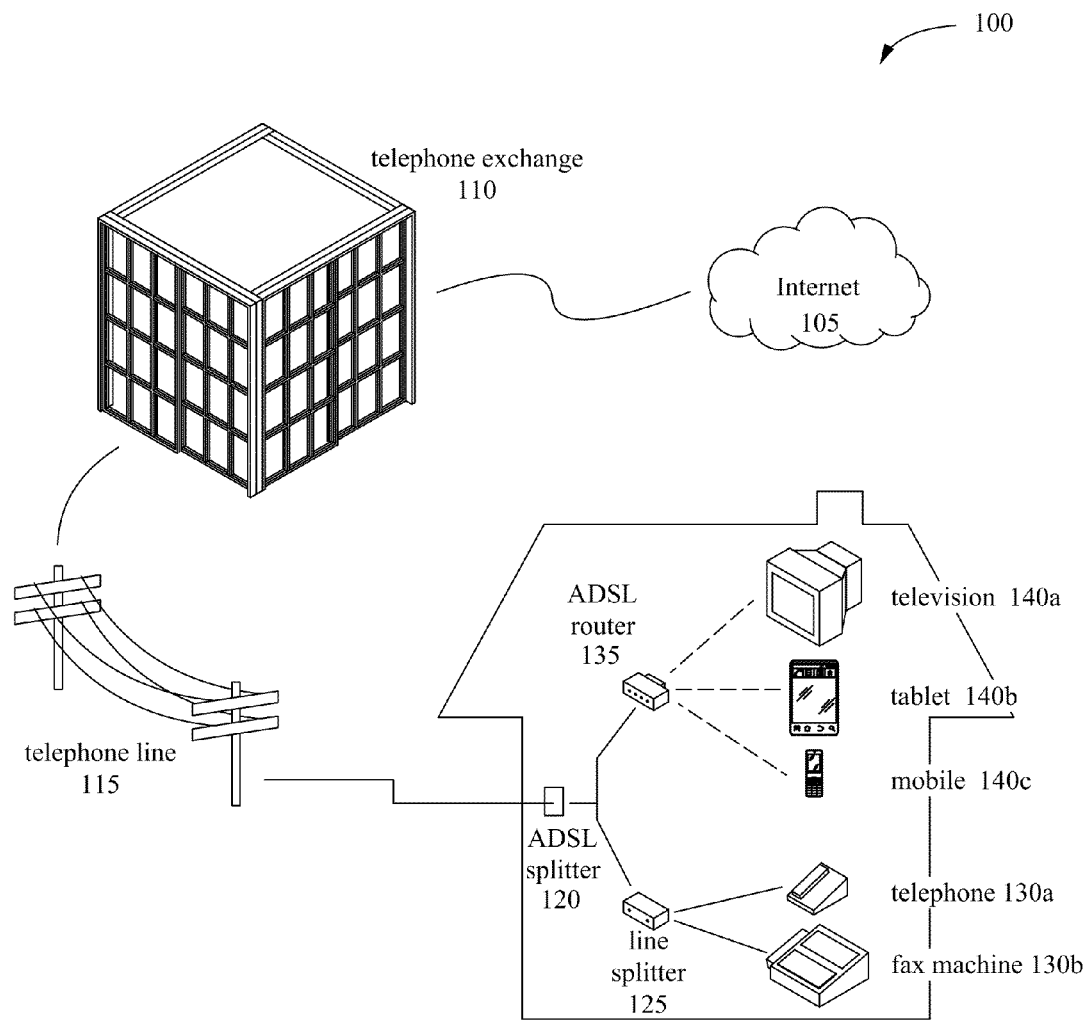
FIG. 1 illustrates an exemplary ADSL network.

FIG. 1 illustrates an exemplary ADSL network 100. ADSL, or otherwise known as asymmetric digital subscriber line, is technology for coupling to the Internet 105. It uses existing copper telephone lines 115 to send and receive data, while allowing users to talk on the phone. An ADSL filter or splitter 120 is installed on a subscriber's home telephone line 115, at a phone outlet, to allow both broadband services 140 and voice services 130 to be used at the same time. Typically, an ADSL router 135 is used to couple one or more end user devices, such as a television 140a, a tablet 140b, and a mobile device 140c, to name a few, to the telephone line 115. A line splitter 125 can be used to split the line, such as, for directing the first line to a telephone 130a and the second line to a fax machine 130b. ADSL is typically distributed over the "last mile" from a telephone exchange 110.

Although some messaging service are able to support multiple connections, other prior art instant messaging solutions, as discussed above, are not designed for multiple devices usage. A session cannot be coupled to more than one end user device 140. For example, a user cannot read messages on her mobile device 140c and send concurrently messages from her tablet 140b. The present invention is dedicated for those solutions that do not support multiple connections.

Embodiments of the present invention are directed to a unified messaging proxy, a system and a method thereof. The unified messaging proxy advantageously enables the user to be communicatively coupled with the same account on a messaging platform using multiple end user devices at the same time. Unlike prior art instant messaging solutions, the user is able to read messages on a first end user device and send messages including responsive messages from a second end user device. As discussed in detail below, the unified messaging proxy manages the multiple end user devices and intercepts all messages to and from the multiple end user devices. From its perspective, the messaging platform only sees a single client application.

Figure 2:
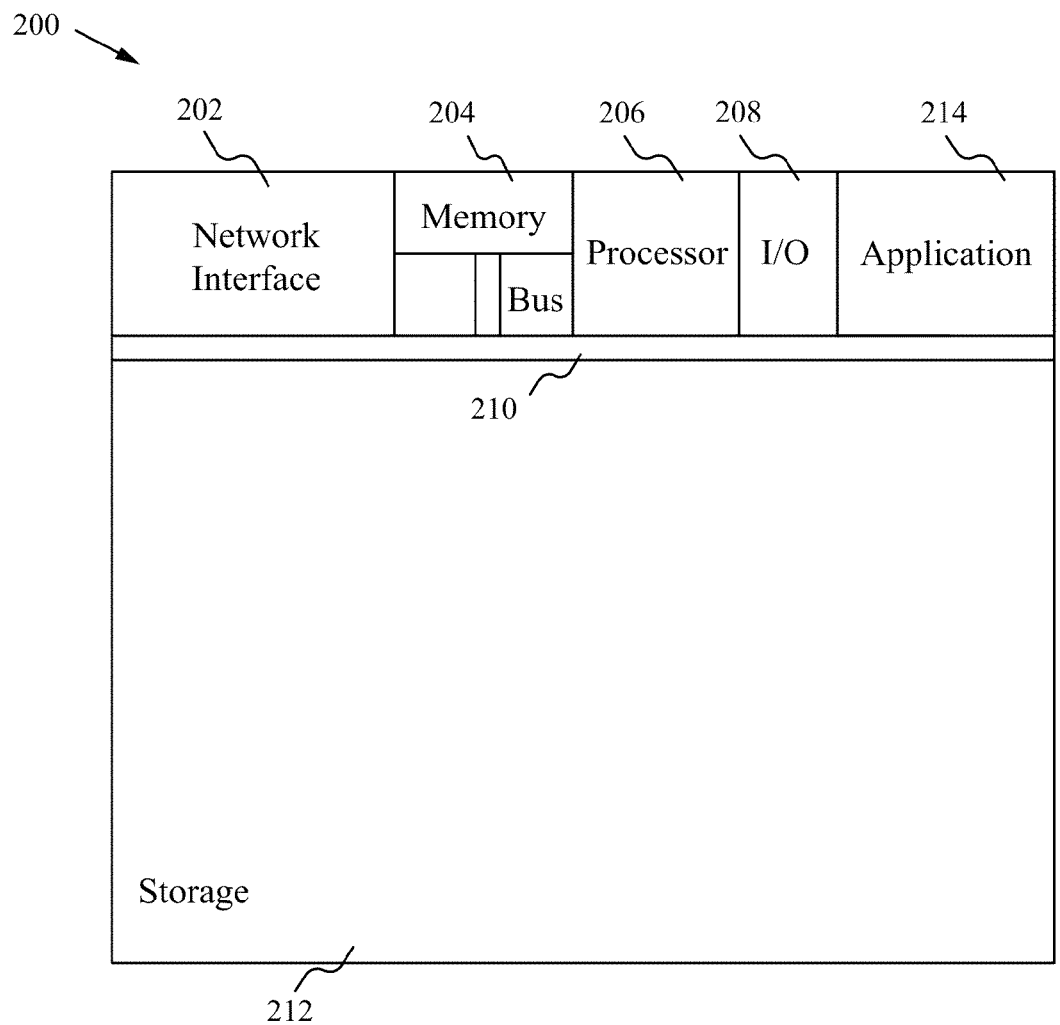
FIG. 2 illustrates a block diagram of a unified messaging proxy in accordance with the present invention.

FIG. 2 illustrates a block diagram of a unified messaging proxy 200 in accordance with the present invention. The unified messaging proxy 200 is able to be used to intercept, acquire, store, compute, process, communicate and/or display information. The unified messaging proxy 200 is also able to interface between at least one messaging platform located anywhere in the Internet or other communication network and one or more end user devices communicatively coupled therewith.

In general, a hardware structure suitable for implementing the unified messaging proxy 200 includes a network interface 202, a memory 204, a processor 206, I/O device(s) 208, a bus 210 and a storage device 212. The choice of processor is not critical as long as a suitable processor with sufficient speed is chosen. The memory 204 is able to be any conventional computer memory known in the art. The storage device 212 is able to include a hard drive, CDROM, CDRW, DVD, DVDRW, Blue-Ray®, flash memory card or any other storage device. The unified messaging proxy 200 is able to include one or more network interfaces 202 to coupled to a cellular network, an Ethernet and/or other type of LAN. The I/O device(s) 208 are able to include one or more of the following: keyboard, mouse, monitor, display, printer, modem, touchscreen, button interface and other devices. In some embodiments, the hardware structure includes multiple processors and other hardware to perform parallel processing. Application(s) 214 are likely to be stored in the storage device 212 and memory 204 and processed as applications are typically processed. More or fewer components shown in FIG. 2 are able to be included in the computing device 200. An example of a suitable unified messaging proxy is a server or any other suitable computing device capable of receiving and sending data.

Figure 3:
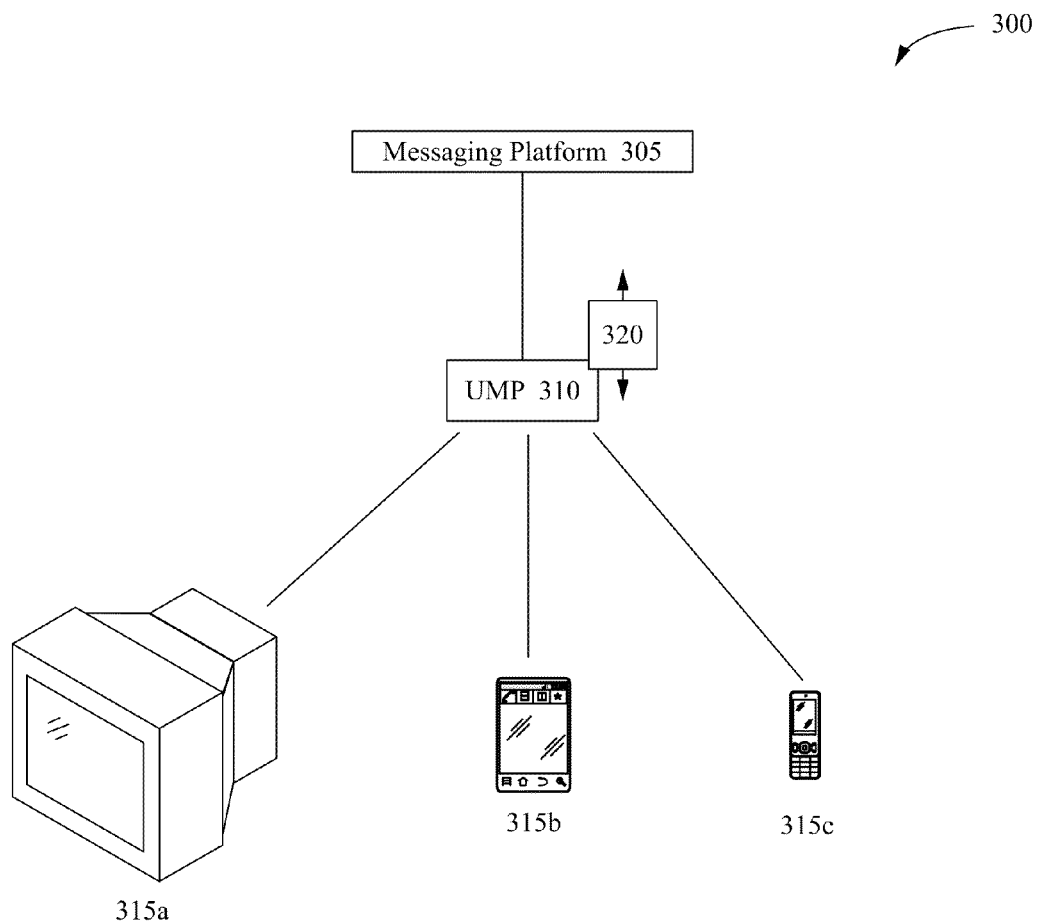
FIG. 3 illustrates an exemplary messaging system in accordance with the present invention.

FIG. 3 illustrates an exemplary messaging system 300 in accordance with the present invention. The messaging system 300 shown includes a messaging platform 305, a unified messaging proxy 310, and one or more end user devices 315. Other components in the messaging system 300 are left out for the sake of simplicity and clarity. The end user devices 315 shown include a television 315a, a tablet 315b and a mobile device 315c. More or less end user devices 315 can be used. Other types of end user devices are contemplated. Each end user device 315 is typically a smart device and is Internet enabled. Although the unified messaging proxy 310 is able to interface with a plurality of messaging platforms, only one messaging platform 305 is shown in FIG. 3. The messaging platform 305 resides somewhere in the Internet.

In some embodiments, the unified messaging proxy 310 is an intercepting proxy, which resides in an ADSL provider infrastructure. In some embodiments, the unified messaging proxy 310 within a subscriber home. In some embodiments, the unified messaging proxy 310 co-resides with a ADSL router. Regardless of where the unified messaging proxy 310 resides in the ADSL provider infrastructure, data (e.g., messages) 320 transferring between the messaging platform 305 and three end user devices 315a-315c pass through this gateway 310 such that the unified messaging proxy 310 is able to intercept the messages 320 and push the messages 320 to appropriate destinations. To the messaging platform 305, there is only a single client messaging application for a session associated with an account on the messaging platform 305 and not three as implemented in the prior art. However, each of the three end user devices 315a-315c is able to access the session simultaneously and/or as long as the session is still open or as long as each of the three end user devices 315a-315c are coupled to the communication network.

Figure 4:
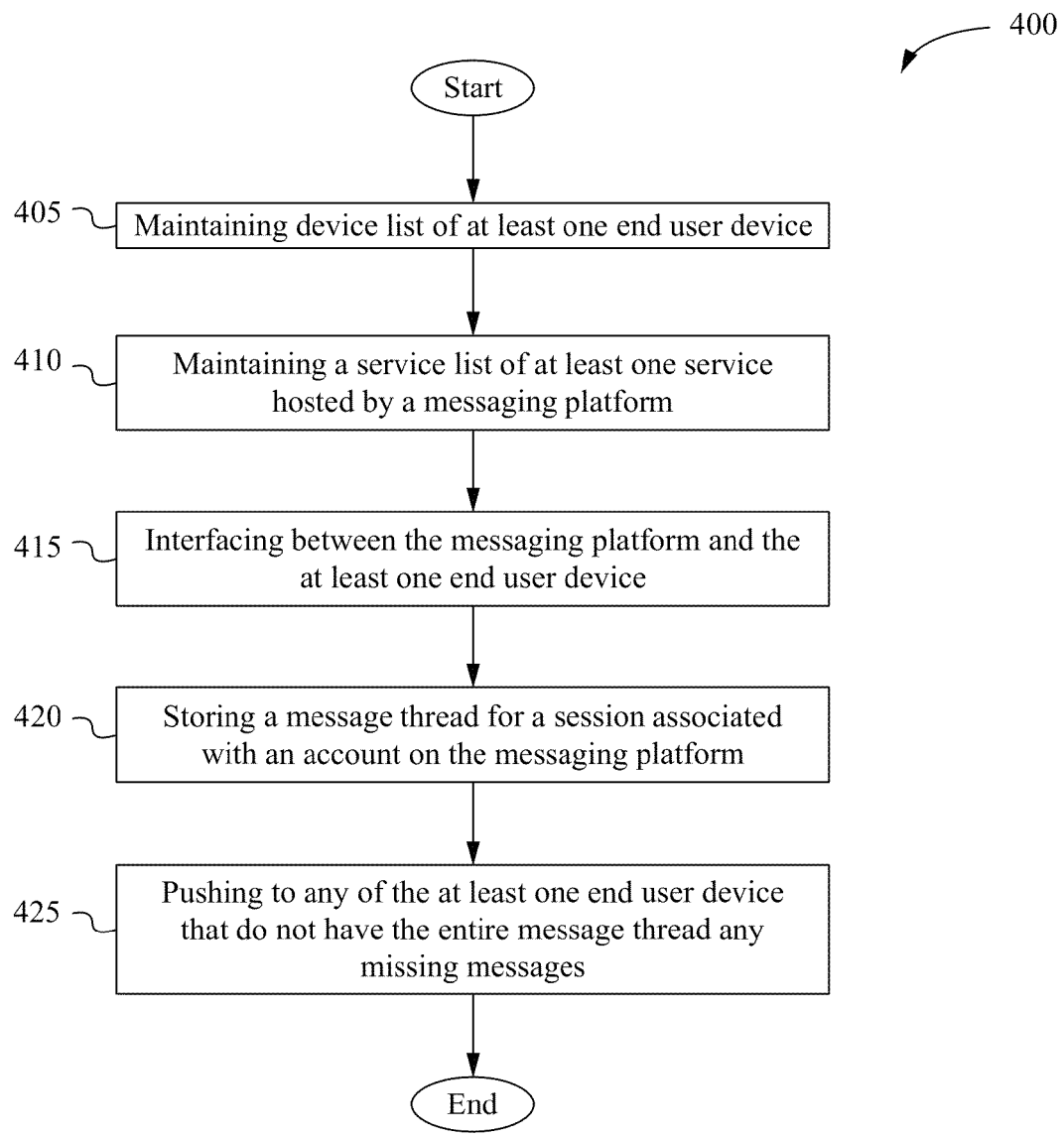
FIG. 4 illustrates an exemplary method of a unified messaging proxy in accordance with the present invention.

FIG. 4 illustrates an exemplary method 400 of a unified messaging proxy in accordance with the present invention. The method 400 begins at a step 405, where the unified messaging proxy maintains a device list for a local network (e.g., sharing same IP address), such as a home network or an office network. The device list is constantly or periodically being updated by the unified messaging proxy to include all end user devices belonging to the home network. The unified messaging proxy is able to detect when a new end user device is associated with the home network and is able to thereafter add that end user device to the device list. Similarly, the unified messaging proxy is able to detect when an existing end user device has disassociated from the home network and is able to thereafter remove that end user device from the device list. In some embodiments, any necessary information fields, along with an identifier, for each end user device are stored as part of the device list.

At a step 410, the unified messaging proxy maintains a service list. The service list is constantly or periodically being updated by the unified messaging proxy to include all services accessed by any of the devices in the device list. The unified messaging proxy is able to detect which a new service is being accessed and is able to thereafter add that new service to the service list. Similarly, the unified messaging proxy is able to detect when an existing service is no longer being accessed (e.g., messaging application on each of the devices in the device list is no longer active, or the device list no longer includes any devices) and is able to thereafter remove that service from the service list. In some embodiments, any necessary information, along with the web location for each service are stored as part of the service list. An exemplary service is a messaging service provided by a messaging platform, such as Yahoo! Massager, Face book Messenger, Windows Live Messenger or Goggle Chat, to name a few.

In some embodiments, the unified messaging proxy maintains a device list and a service list for every user in the home network via a user list. The unified messaging proxy is able to implement other securities such that messages are forwarded to intended user recipients.

At a step 415, the unified messaging proxy interfaces between a messaging platform and the at least one end user device. Upon a user opening a session associated with an account on a messaging platform from a first end user device, the unified messaging proxy updates the service list and begins to manage that session. The messaging platform thereafter sees the unified messaging proxy as the client rather than the first end user device. When the user uses a second end user device to access the same account on messaging platform, the messaging platform will know that the session for the account has already been created and prevents another session from being opened. Since the unified messaging proxy behaves an interface between the messaging platform and all end user devices, the messaging platform only sees one client application, regardless of the number of end user devices are used to access the account.

At a step 420, the unified messaging proxy stores a message thread for the session associated with the account on the messaging platform. Since the unified messaging proxy interfaces between the messaging platform and all end user devices, the unified messaging proxy intercepts every message sent to and from the end user devices and the messaging platform. All intercepted messages become part of the message thread.

At a step 425, the unified messaging proxy pushes to any of the at least one end user device that do not have the entire message thread (e.g., missing at least one message). For example, if the unified messaging proxy detects that a third end user device had just been associated with the home network, the unified messaging proxy will push the entire message thread to the third end user device so that the user is able to see the entire message thread on the third end user device. After the step 420, the method 400 ends.

Figure 5:
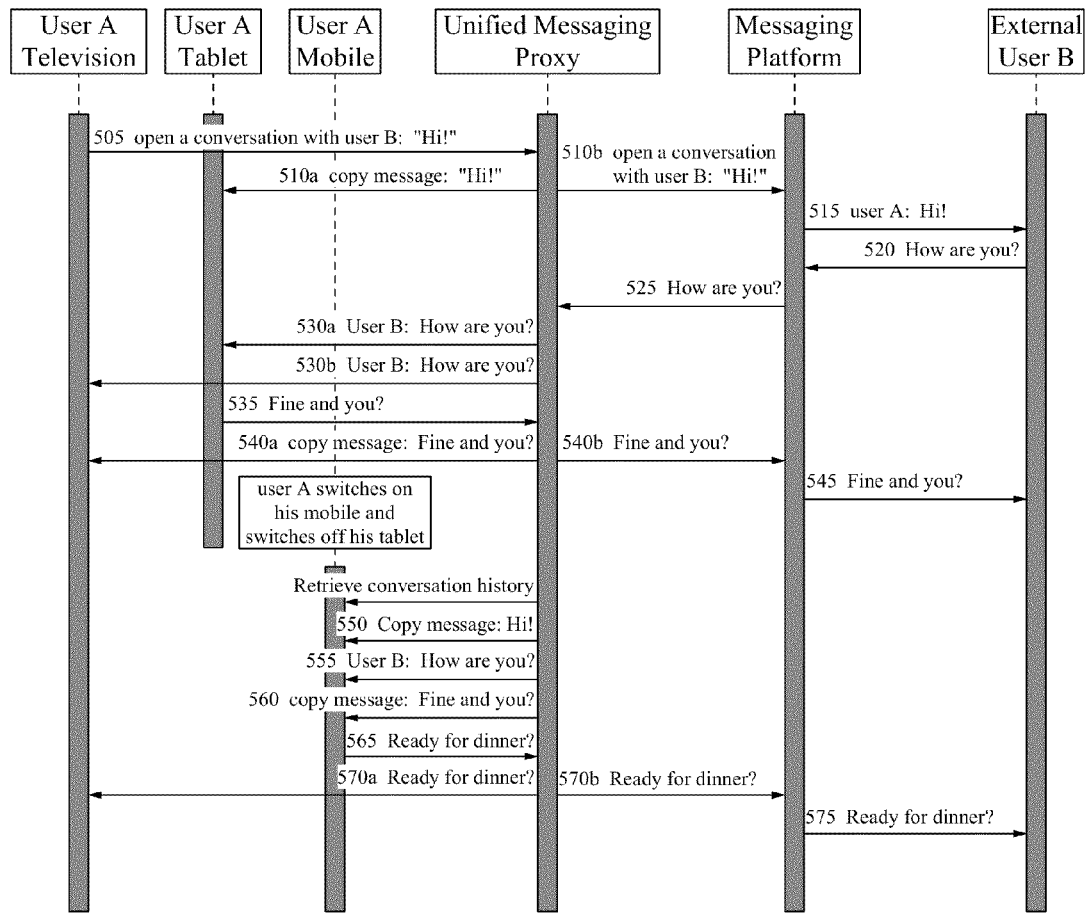
FIG. 5 illustrates an exemplary use case diagram in accordance with the present invention.

FIG. 5 illustrates an exemplary use case diagram 500 in accordance with the present invention. As discussed above, a unified messaging proxy typically interfaces between all communicatively coupled end user devices and a messaging platform. Assume that User A has three end user devices, a television, a tablet and a mobile device. However, only the television and the tablet are currently associated with User A's home network. The use case diagram 500 illustrates the conversation between User A and User B. The use case diagram 500 begins at a step 505, wherein using a television, User A opens a conversation with User B via a messaging platform. User A sends the text message "Hi!"

The unified messaging proxy intercepts the message "Hi!" and opens a conversation with User B. The unified messaging proxy pushes or sends the message "Hi!" to the tablet at a step 510*a* and to the messaging platform at a step 510*b*, either concurrently or one immediately after another.

After the messaging platform receives the message "Hi!", the messaging platform forwards the message "Hi!" to User B at a step 515.

User B messages "How are you?" at a step 520 via the messaging platform, which forwards the message "How are you?" to User A at a step 525. As discussed above, the messaging platform sees the unified messaging proxy as the client rather than each end user devices. Thus, the messaging platform forwards the message "How are you?" to the unified messaging proxy.

After the unified messaging proxy receives the message "How are you?", the unified messaging proxy forwards the message "How are you?" to the communicatively coupled end user devices, namely the television and the tablet, at steps 530*a* and 530*b*, either concurrently or one immediately after another.

At a step 535, using the tablet User A responds to User B with the message "Fine and you?"

The unified messaging platform again intercepts the message "Fine and you?" and pushes or sends the "Fine and you?" message to the television at a step 540*a* and to the messaging platform at a step 540*b*, either concurrently or one immediately after another.

After the messaging platform receives the message "Fine and you?", the messaging platform forwards the message "Fine and you?" to User B at a step 545.

At this time, User A switches on his mobile device and switches off his tablet. The unified messaging proxy detects the association of the mobile device with the home network and adds the mobile device as part of the device list, and detects the disassociation of the tablet and removes the table from the device list. The entire conversation history associated with the session is retrieved from the unified messaging proxy and delivered onto the mobile device. It will be appreciated that User A could have maintained his tablet in an on condition. At steps 550-560, the messages "Hi!", "How are you?" and "Fine and you?" are pushed to the mobile device from the unified messaging proxy. As such, all messages from the session are synched on the mobile device.

At a step 565, using the mobile device, User A responds to User B with the message "Ready for dinner?"

The unified messaging platform intercepts the message "Ready for dinner?" and pushes the message to the television at a step 570*a* and to the messaging platform at a step 570*b*, either concurrently or one after another.

After the unified messaging platform receives the message "Ready for dinner?", the unified messaging platform forwards the message "Ready for dinner?" to User B at a step 575.

The present invention can be used by an ADSL provider to control the way services are provided in its network and to connect with any kind and number of messaging services. A service provider would see a user connected to one "virtual device" coming from the ADSL provider's network, allowing the user to start a conversation from her mobile device connected to the local WiFi, and to advantageously switch from the mobile device to her television connected to the local WiFi to continue the conversation.

While the invention has been described with reference to numerous specific details, one of ordinary skill in the art will recognize that the invention can be embodied in other specific forms without departing from the spirit of the invention. Thus, one of ordinary skill in the art will understand that the invention is not to be limited by the foregoing illustrative details, but rather is to be defined by the appended claims.

We claim:

1. A non-transitory computer-readable medium storing instructions that, when executed by a computing device, cause the computing device to perform a method comprising:
   a. the computing device maintaining a device list of at least two end user devices;
   b. the computing device maintaining a service list of at least one service hosted by a messaging platform;
   c. the computing device interfacing between the messaging platform and the at least two end user devices;
   d. the computing device creating only one session for an account on the messaging platform, wherein the at least two end user devices are able to access the account;
   e. the computing device preventing another session for the account from being opened;
   f. the computing device storing a message thread for the one session associated with the account on the messaging platform; and
   g. the computing device pushing to any of the at least two end user devices that do not have the entire message thread any missing messages.

2. The non-transitory computer-readable medium of claim 1, wherein maintaining a device list includes automatically detecting all end user devices associated with the same local network, wherein the device list is based on the detection.

3. The non-transitory computer-readable medium of claim 2, wherein maintaining a device list further includes adding a new end user device to the device list upon the new end user device associating with the local network.

4. The non-transitory computer-readable medium of claim 2, wherein maintaining a device list further includes removing an existing end user device from the device list upon that end user device disassociating with the local network.

5. The non-transitory computer-readable medium of claim 1, wherein maintaining a service list includes detecting all services accessed from any device in the device list.

6. The non-transitory computer-readable medium of claim 5, wherein maintaining a service list further includes adding a new service to the service list upon access to the new service by any device in the device list.

7. The non-transitory computer-readable medium of claim 5, wherein maintaining a service list further includes removing an existing service from the service list upon one of detecting that a messaging application on each devices from the device list is no longer active and detecting that the device list no longer includes any devices.

8. The non-transitory computer-readable medium of claim 1, wherein pushing to any of the at least two end user devices includes:
   a. detecting a new end device; and
   b. sending the new end device the entire message thread.

9. The non-transitory computer-readable medium of claim 1, further comprising:
   a. intercepting a message from a first end user device; and
   b. forwarding the message to other end user devices and to the messaging platform.

10. The non-transitory computer-readable medium of claim 1, further comprising:
    a. intercepting a message from the messaging platform; and
    b. forwarding the message to each of the at least two end user devices.

11. The non-transitory computer-readable medium of claim 1, further comprising maintaining a user list of at least one user who uses any device in the device list.

12. A non-transitory computer-readable medium storing instructions that, when executed by a computing device, cause the computing device to perform a method comprising:
    a. the computing device automatically detecting all end user devices when each of the end user device associates with the same local network that the computing device is associated with;
    b. the computing device maintaining a device list of at least two end user devices, wherein the device list is based on the detection;
    c. the computing device maintaining a service list of all services accessed by the devices listed in the device list, wherein the service list includes at least one service hosted by a messaging platform that is separate from the computing device, wherein the messaging platform includes a user account;
    d. the computing device interfacing between the messaging platform and the at least two end user devices such that to the messaging platform, there is a single session associated with the user account that is simultaneously accessed by the at least two end user device;
    e. the computing device storing a message thread for the session associated with the user account on the messaging platform; and
    f. the computing device pushing to any of the at least two end user devices that do not have the entire message thread any missing messages.

13. A system comprising:
    a. a plurality of end user devices associated with the same local network; and
    b. a unified messaging proxy configured to:
       i. maintain a device list of the plurality of end user devices;
       ii. maintain a service list of at least one service hosted by a messaging platform;
       iii. interface between the messaging platform and the plurality of end user devices;
       iv. create only one session for an account on the messaging platform, wherein the plurality of end user devices are able to access the account;
       v. prevent another session for the account from being opened;
       vi. store a message thread for the one session associated with the account on the messaging platform; and
       vii. push to any of the plurality of end user devices that do not have the entire message thread any missing messages.

14. The system of claim 13, wherein each end user device is a smart device.

15. The system of claim 13, wherein the unified messaging proxy resides in an ADSL provider infrastructure.

16. The system of claim 13, wherein the unified message proxy is configured to interface with a plurality of messaging platforms.

17. The system of claim 13, wherein the unified messaging proxy configured to:
    a. manage the session;
    b. detect another end user device that has associated with the network; and
    c. synching messages from the session on the another end user device.

18. The system of claim 13, wherein the unified messaging proxy is configured to:

a. receive a message from one of the plurality of end user devices; and b. push the message to others of the plurality of user devices and to the messaging platform.

19. The system of claim 13, wherein the unified messaging proxy is configured to:

a. receive a message from the messaging platform; and b. push the message to the plurality of end user devices.

20. The system of claim 13, wherein a user is able to read messages on a first of the plurality of end user devices and send messages from a second of the plurality of end user devices.

21. The system of claim 13, wherein the local network is a home network.

22. The system of claim 13, wherein the unified messaging proxy co-resides with a ADSL router.

* * * * *